United States Patent
Fredlund et al.

[11] Patent Number: 5,867,282
[45] Date of Patent: Feb. 2, 1999

[54] METHOD OF COMBINING TWO DIGITALLY GENERATED IMAGES WHEREIN ONE IS CUSTOMIZED IN VIEW OF THE OTHER

[75] Inventors: John Randall Fredlund; Ronald Steven Cok, both of Rochester, N.Y.

[73] Assignee: Eastman Kodak Company, Rochester, N.Y.

[21] Appl. No.: 681,774

[22] Filed: Jul. 29, 1996

[51] Int. Cl.⁶ .................................................. H04N 1/387
[52] U.S. Cl. .................... 358/450; 358/444; 358/449; 358/451
[58] Field of Search ................... 358/450, 452, 358/451, 537, 540, 528, 449, 524, 538, 444, 442; 395/117, 114, 105; 382/284, 294, 298

[56] References Cited

U.S. PATENT DOCUMENTS

| | | | |
|---|---|---|---|
| 5,034,806 | 7/1991 | Ikeda et al. | 358/540 |
| 5,459,819 | 10/1995 | Watkins et al. | 395/117 |
| 5,585,945 | 12/1996 | Ikeda et al. | 358/540 |
| 5,631,983 | 5/1997 | Ohnishi et al. | 358/450 |
| 5,659,770 | 8/1997 | Yamada | 358/450 |

Primary Examiner—Edward L. Coles
Assistant Examiner—Cheukfan Lee
Attorney, Agent, or Firm—Frank Pincelli

[57] ABSTRACT

A method of combining at least one captured generated digital image and/or text with at least one prestored digital image. The method includes selecting a prestored digital image. The prestored digital image has a predetermined location where a selected captured generated digital image and/or text may be placed. A selected customer generated image in digital form is obtained for placement at the predetermined location. The selected image prior to placement at the location is automatically modified in accordance with predetermined size or shape relationship of the location.

9 Claims, 8 Drawing Sheets

METHOD OF COMBINING TWO DIGITALLY GENERATED IMAGES WHEREIN ONE IS CUSTOMIZED IN VIEW OF THE OTHER

FIELD OF THE INVENTION

This is directed to a system and method for producing customized images by merging at least two images obtained from different sources and printing the images on at least one output format.

BACKGROUND OF THE INVENTION

It is known from U.S. Pat. No. 5,459,819 to combine at least two different digital images so as to form a single merged digital image. When these two different images are combined, adjustments are typically required in order for the images to have an appropriate aesthetic appeal. For example, if the size of one of the images is disproportionate to that of the other image, an overall unaesthetic appearance may result in the merged image. Thus, it may be desired to have a very specific size relationship between objects of one image to that of the other. While this modification can be made with the prior system, this requires a substantial amount of operator time in order to make these adjustments.

Applicants have solved this problem by providing means for automatically sizing or adjusting the shape of one of the selected images with respect to a prestored image having a location for receiving the selected image. The selected image is automatically adjusted in size and/or shape in accordance with a predetermined relationship. Thus, any size or shape relationship can be made quickly, and easily obtained with a minimum of operator time and effort.

SUMMARY OF THE INVENTION

A method of combining at least one captured generated digital image and a prestored digital image, comprising the steps of:

a) selecting a prestored digital image, the prestored digital image having a predetermined location where a selected captured generated digital image may be placed, the location of the prestored image having a predetermined size or shape relationship;

b) obtaining a selected customer generated image in digital form;

c) automatically modifying the selected customer generated image in accordance with the predetermined size or shape relationship of the location of the prestored digital image so as to form a modified image; and d) combining the modified image with the prestored digital image such that the modified image is located at the predetermined location so as to form a merged digital image.

DESCRIPTION OF THE DRAWINGS

In the detailed description of the preferred embodiment of the invention presented below, reference is made to the accompanying drawings, in which.

DETAILED DESCRIPTION OF THE INVENTION

Figure 1:
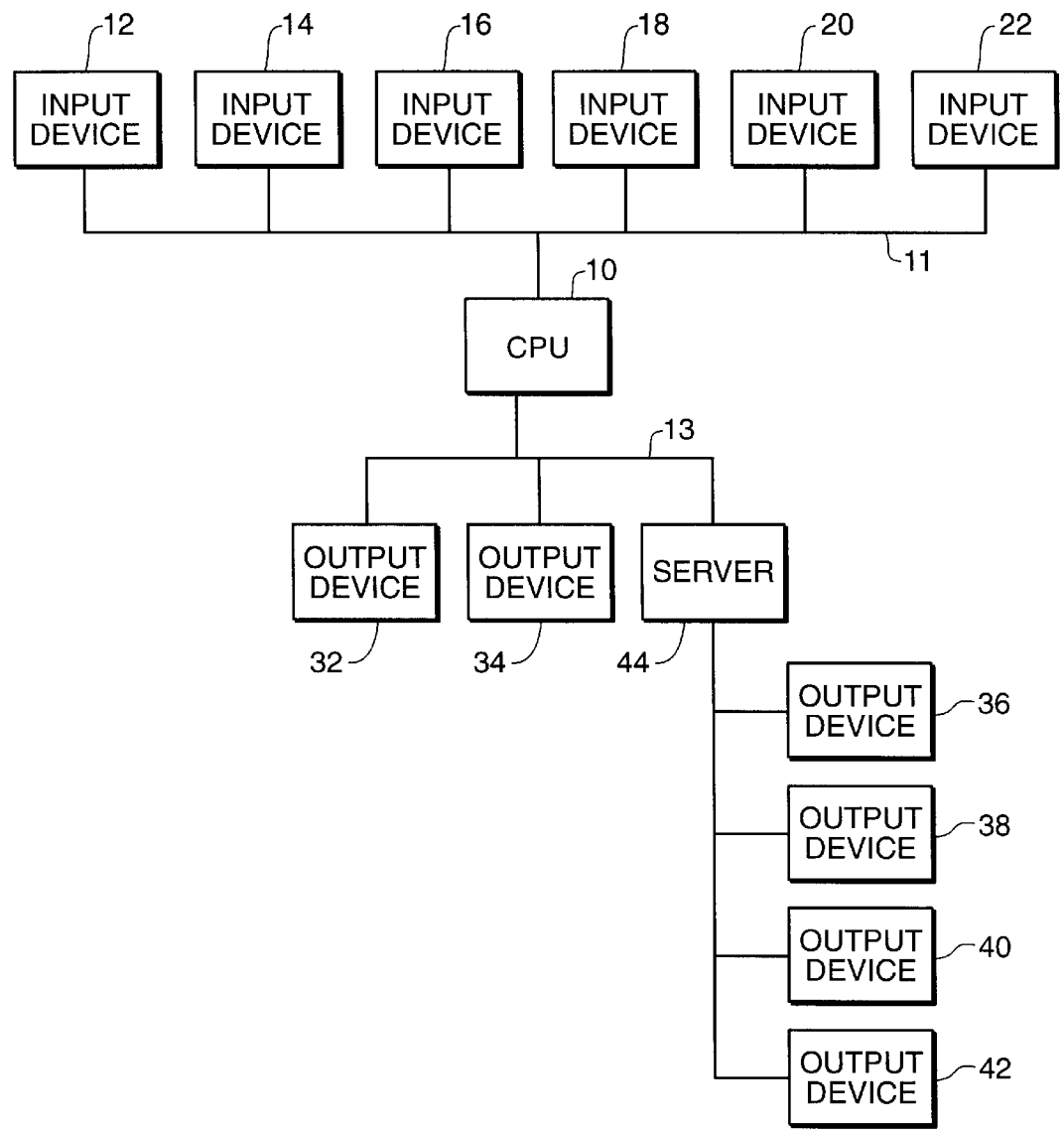
FIG. 1 is a schematic block diagram of a system made in accordance with the present invention.

Referring to FIG. 1, there is illustrated in block diagram form, a system for producing customized images and imprinting these customized images onto a variety of different formats. In particular, the system includes a central processing unit (CPU) 10 which can take the form of any appropriate computer. In the particular embodiment illustrated, the central processing unit 10 comprises an Apple Macintosh Computer which is used to control the various input and output devices. A plurality of input devices 12,14,16,18,20,22 are provided for generating an image in a digital format. In particular, first input device 12 comprises a scanner used to scan photographic negatives or slides, both color and monochrome. In the particular embodiment illustrated, the input device 12 comprises a Rapid Film Scanner 2035, made by the Eastman Kodak Company. The input device 12 scans the film and produces a digital output which is forwarded onto the central processing unit 10 by an appropriate data link system 11 for storage in memory and further manipulation. Likewise, input device 14 is provided for scanning of photographic pictures, printed or drawn, both color and/or monochrome, and producing a digitized signal which is representing the image scanned. The Coloredge Printer, sold by the Eastman Kodak Company, has a scanner built therein which is capable of scanning photographic pictures, or any type printed material, and providing the appropriate digital signal for the computer 10. The second input device 14 is appropriately connected to the CPU 10 such that the CPU 10 may appropriately receive and manipulate the information obtained therefrom. Likewise, input devices 16,18,20,22 are provided for obtaining digital signals representative of an image from various sources. In particular, input device 16 is a video camera designed to obtain images, and input device 18 comprises a CD (compact disc) reader for reading digitally stored information on a compact disc. Input device 20 comprises an electronic camera such as the DCS 200 Digital Camera, produced by the Eastman Kodak Company. Input device 22 may be any other input device which is capable of providing a digital signal representative of an image to the CPU, for example, video tape and video laser disc.

The CPU 10 is also connected to a variety of output devices 32,34,36,38,40,42. These output devices are all appropriately connected to the central processing unit 10 by an appropriate data link system 13 as is well known in the prior art. For example, but not by way of limitation, by an Ethernet data link system. The output device 32, for instance, comprises an electrophotographic printer such as the Kodak Image Magic Heavy Stock Printer, sold by the Eastman Kodak Company, which takes the digital image and transfers the image onto media which can then be used to produce transfers for use on garments. The output device 34, in the embodiment illustrated, is a cathode-ray tube printer (CRT), in particular, the PCD 600 Printer, produced by the Eastman Kodak Company, which takes an image that is displayed on a cathode-ray tube and focuses it onto a photographic paper. Also provided is a thermal printer 36 for printing images onto thermal media. An example of a suitable thermal printer is the XLS 8600 Digital Thermal Color Printer, sold by the Eastman Kodak Company. In particular, printer 38 can be a thermal printer for providing transfers for use on T-shirts, whereas thermal printer 40 can be used for providing transfers for placement on mugs. The last output device 42 illustrated is an inkjet printer which can be used to imprint the merged image on greeting cards and the like. Various other devices may be provided for transferring onto various other formats such as garments, mugs, posters, banners, life-size cut-outs, holographic and 3-D imaging, balloons, pens, and pencils.

In the preferred embodiment illustrated, a server 44, such as the Power PC Apple Macintosh Computer, is used for managing information from the CPU 10 and for appropriately providing information to the various printing devices associated therewith. Likewise, if so desired, additional computers may be provided in association with each of the input or output devices for managing information and providing further customizing features as deemed appropriate. For a more simplified system, the input and output devices may all be connected to a single computer. Also it is to be understood that any type suitable printing device may be employed for producing the image in the desired format, the present invention not being limited by the printing devices described herein.

It is to be understood that the CPU 10 may be provided with a monitor for viewing various screens for indicating the status of the system and available options for controlling and/or operating the system as is customarily done in the prior art. The CPU is also provided with an appropriate input device such as a keyboard, touchscreen, or pointing device as are well known in the prior art for allowing the operator to properly operate the system. Thus, the user, which may be the operator and/or customer, can also view the various images being input into the system and generated by the system so that the appropriate selections can be made by the user and/or customer. In the CPU there is stored a plurality of prestored images which may comprise a variety of artistic themes having at least one location for receiving a customer generated digital image. Any one of these prestored images may be selected and digitally merged with the customer generated image(s) captured by any of the input devices 12,14,16,16,20,22.

A more detailed description of the operation of the system disclosed in FIG. 1 is described in U.S. Pat. No. 5,459,819, which is hereby incorporated by reference in its entirety.

Figure 2:
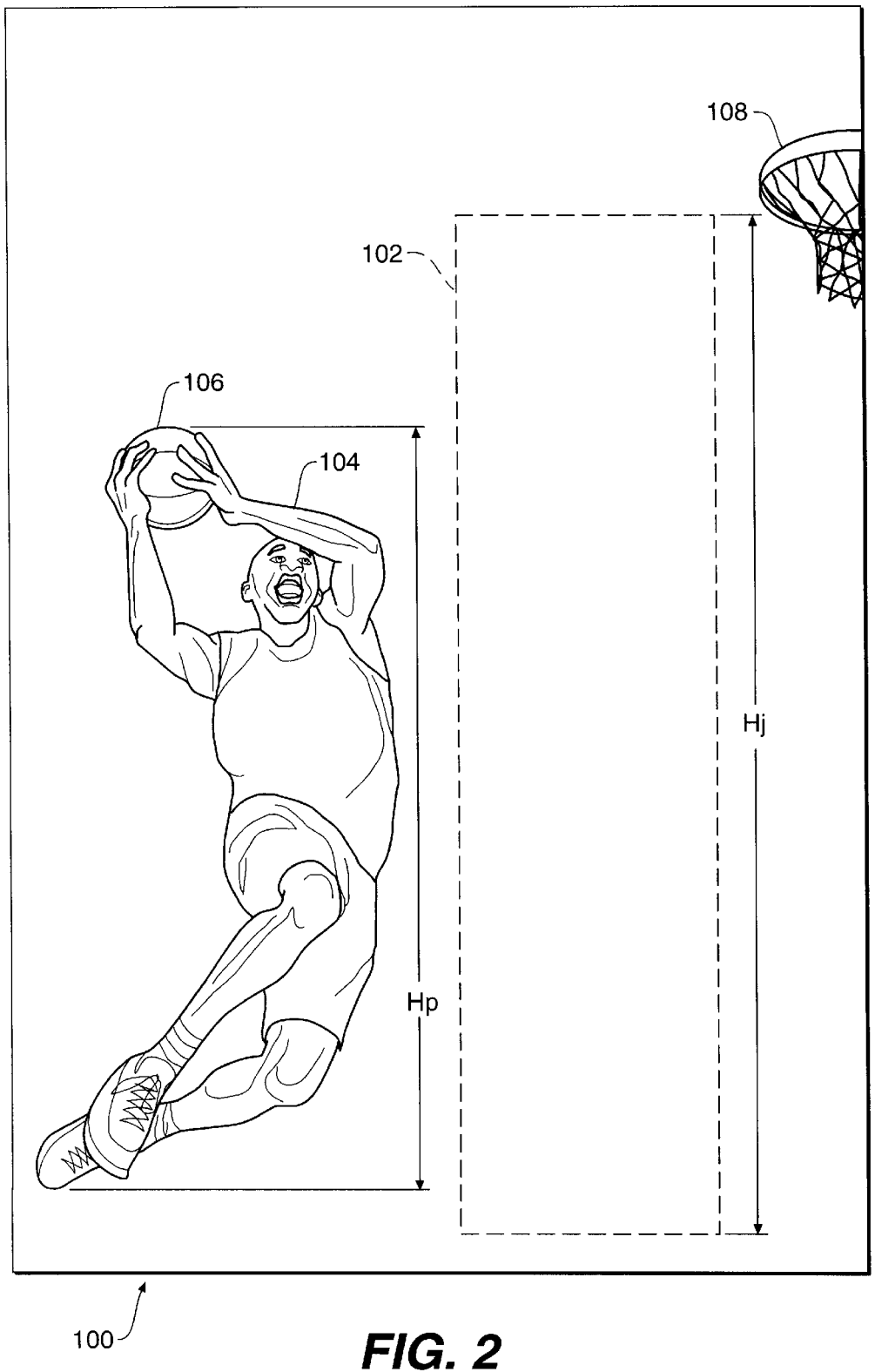
FIG. 2 illustrates an example of a prestored image having a single location for receiving a customer generated digital image.

Referring to FIG. 2, there is illustrated a digital prestored image 100 that has been stored in the memory of CPU 10. The prestored image 100 has at least location 102 (as indicated by a dash line) where a selected customer generated digital image element 110 (see FIG. 3) can be placed. In the embodiment illustrated, the image 100 has a single location 102. In the embodiment illustrated the prestored image 100 has a sports theme, and more particularly, a basketball player 104 in the process of trying to place a basketball 106 into the basketball hoop 108. It is often desirable to merge the image of an individual with a sport personality/player or other unique situation.

Figure 3:
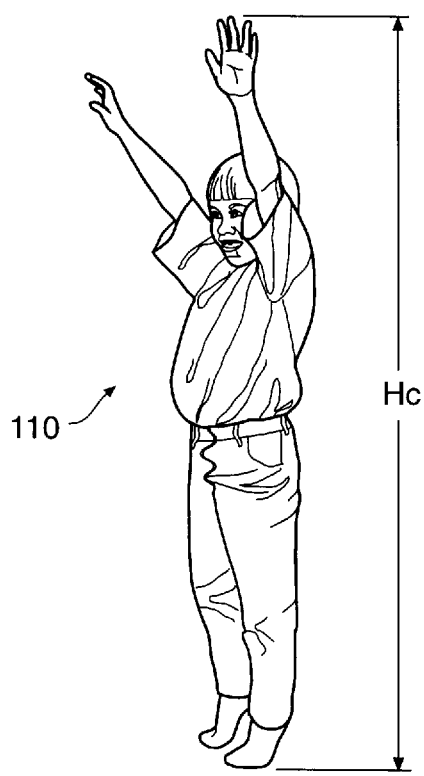
FIG. 3 is a customer generated digital image element to be merged into the prestored image of FIG. 2.
Figure 4:
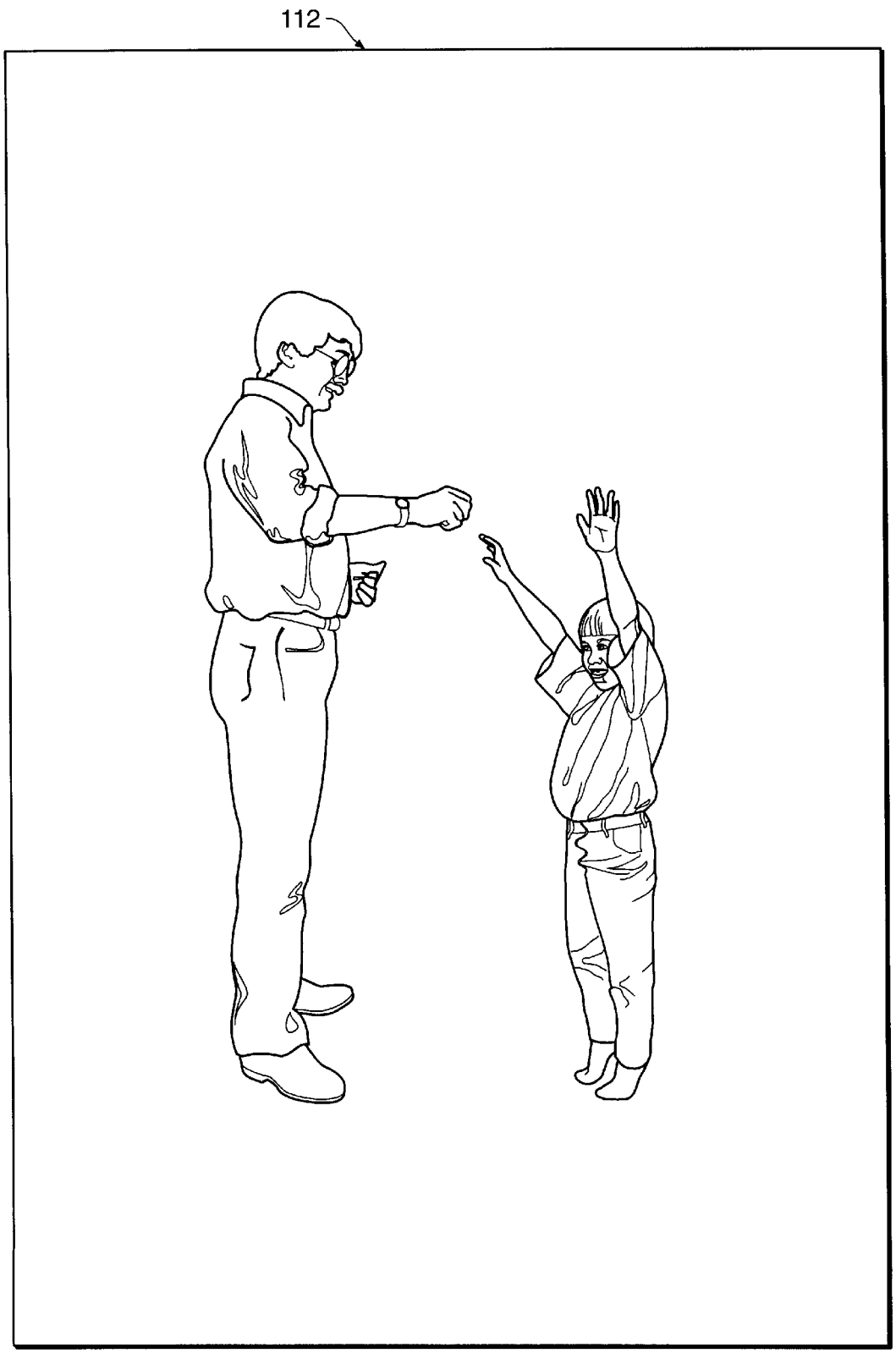
FIG. 4 illustrates the original photograph from which the image element of FIG. 3 was obtained.
Figure 5:
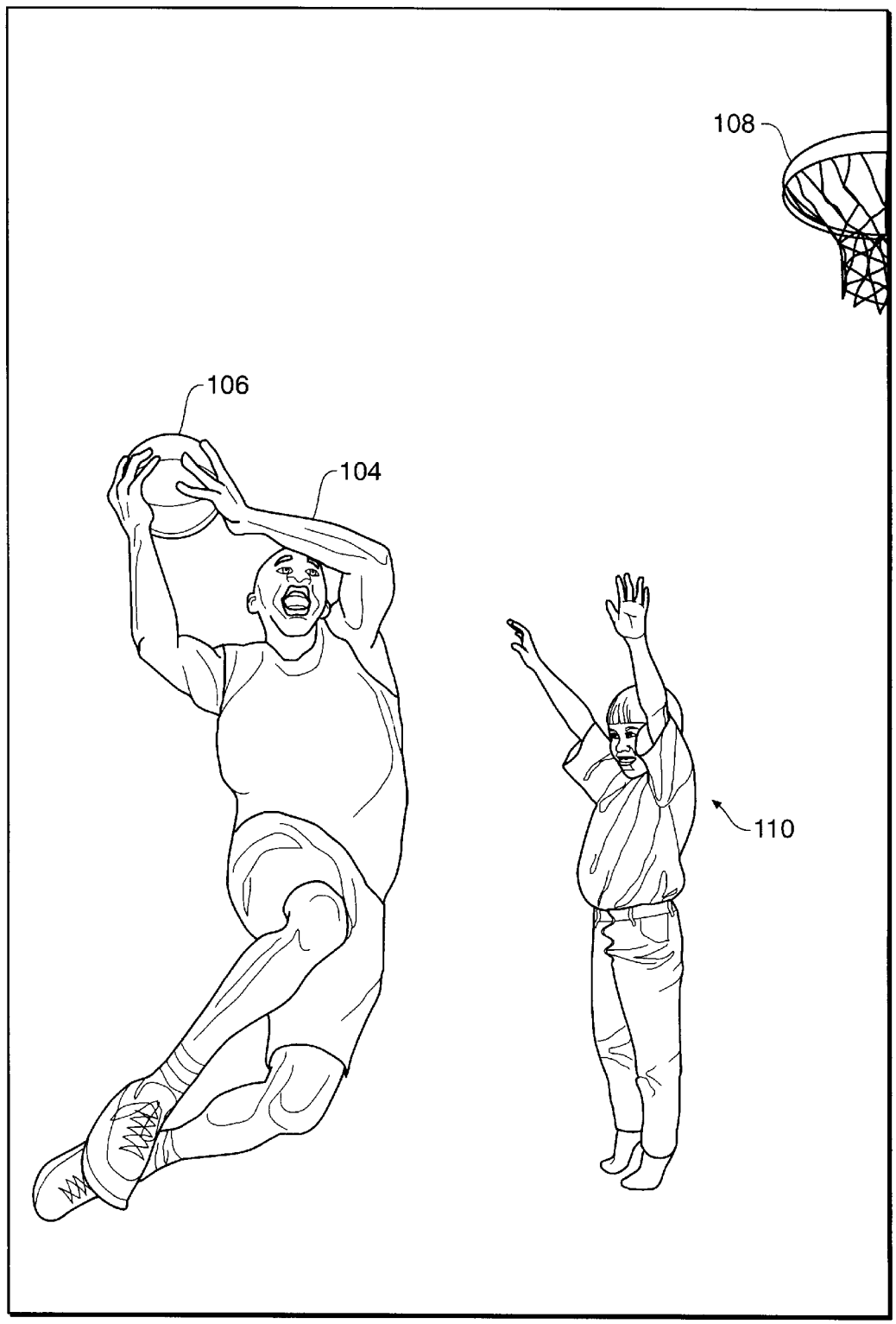
FIG. 5 illustrates the merging of the image element of FIG. 3 with the prestored image of FIG. 2 without any size adjustment.

Referring to FIG. 3, there is illustrated the customer generated digital image element 110 in the original image from which it was obtained. The selected image element 110 in the embodiment illustrated was obtained by scanning a photograph 112, as shown in FIG. 4, in which a child is depicted. Scanning of the photograph provides a digital record file of the photograph 112. From the digital record file the image element 110 of the child was electronically removed from the remaining portion of the photograph by CPU 10 through the use of appropriate computer software, such as the Photoshop software sold by Adobe Systems, Inc. However, the selected image element 110 may be obtained by any other technique desired, for example, but not by way of limitation, a chroma key technique where an electronic camera is used to capture an image of an individual placed in front of a green screen. The individual can then be easily obtained by eliminating the colored background, thus capturing only the individual. In the particular embodiment illustrated, the selected image element 110 is that of a young child, however, the selected image may comprise any desired person and/or object. The selected image element 110 as scanned (or otherwise inputted) has a height Hc in comparison to the height Hp of the player 104. In the particular embodiment illustrated, the prestored digital image 100 is designed to be a novelty-type product when a customer generated image is merged therewith. The merged imaged is designed to illustrate a special effect (relationship) between the player 104 and the child 110. In the particular embodiment illustrated, it is desirable to show that the selected image element 110 have a height advantage over the professional sports player 104 contrary to what would be expected. The location 102 has a height Hj. However, if the selected image element 110 as originally obtained is merged with the prestored image, the resulting merged image as illustrated in FIG. 5 would be obtained which is totally in opposition to the desired visual appearance.

Figure 6:
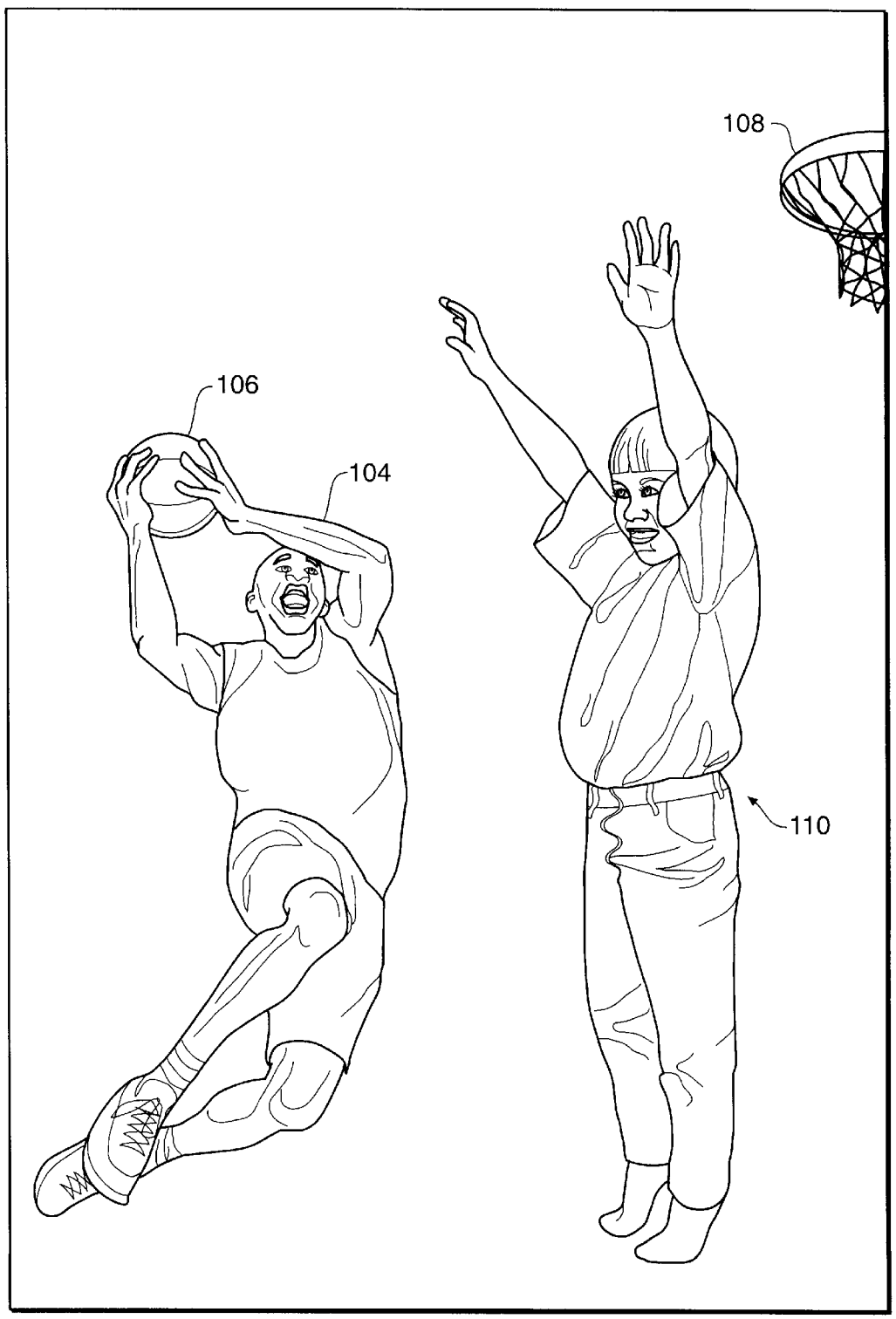
FIG. 6 illustrates the merging of the image of FIG. 3 with the prestored image of FIG. 2 with size adjustment according to the present invention.

When prestored image 100 is selected, an appropriate inquiry is made of the user/customer to determine what image element is to be placed into the location 102. The height Hc of the selected image element 110 of the child is adjusted to correspond to height Hj which provides a particular relationship with respect to player 104. In particular, once the height Hc has been obtained, the height Hc of the selected image element 110 is automatically modified to correspond to height Hj as illustrated in FIG. 3. Hj, in the embodiment illustrated, is selected to provide an illusion that the selected image element 110, for example, the image of the child, is greater than that of the sport player 104. The merged image with size adjustment is illustrated in FIG. 6.

Figure 7:
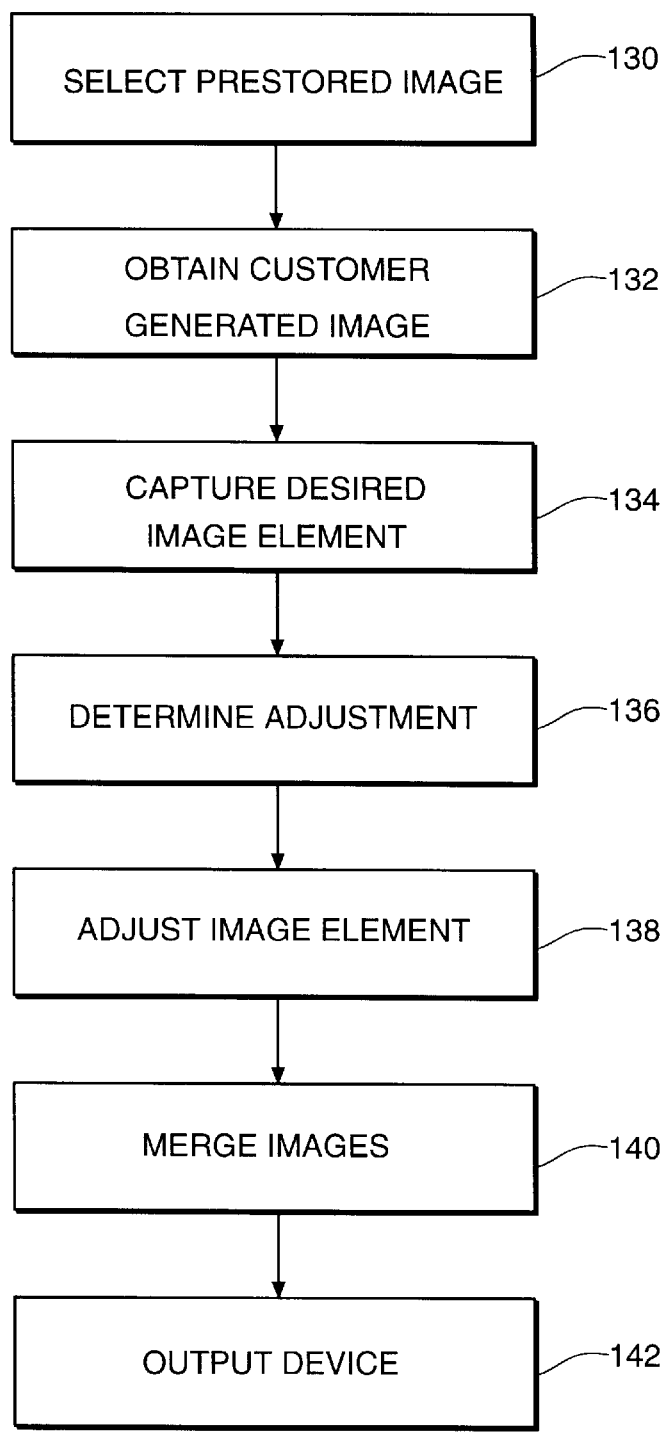
FIG. 7 is a flow chart illustrating the method according to the present invention.

In order to more fully understand the present invention, a brief description of the system and how the images are modified will now be described with respect to the flow chart illustrated in FIG. 7. Step 130 indicates a first decision step wherein a prestored image (PSI), such as image 100, is selected from the computer memory of CPU 10 in which a customer generated image (CGI) element is to be merged. Then a digital record file of a selected CGI element is obtained at step 132, for example, by scanning a photograph. It should be understood that the digital record file may be obtained by any method, for example, but not by way of limitation, a digital record file obtained directly from a computer disc or from another computer through a data transmission link. At step 134 the selected CGI element, for example, the child, is obtained from the record file. Then the size to which the person and/or object is to be adjusted is determined at step 136, for example, the height Hj. Thereafter, at step 138, the selected CGI is adjusted to the desired size, for example, Hj. The modified selected CGI is then merged with the PSI at step 140. Thereafter, the merged image is forwarded to an appropriate output device such as a printer at step 142.

Figure 8:
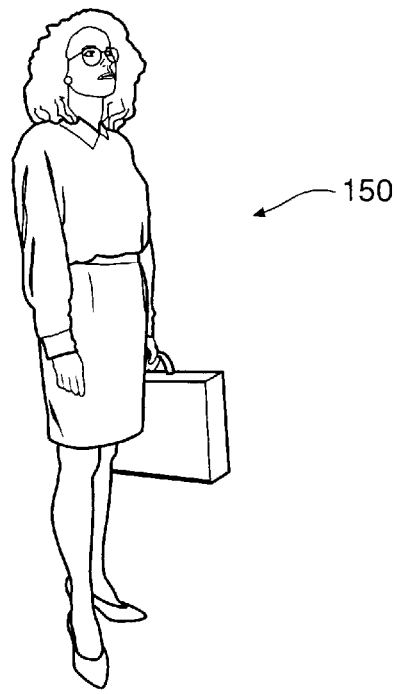
FIG. 8 illustrates a selected customer generated digital image.
Figure 9:
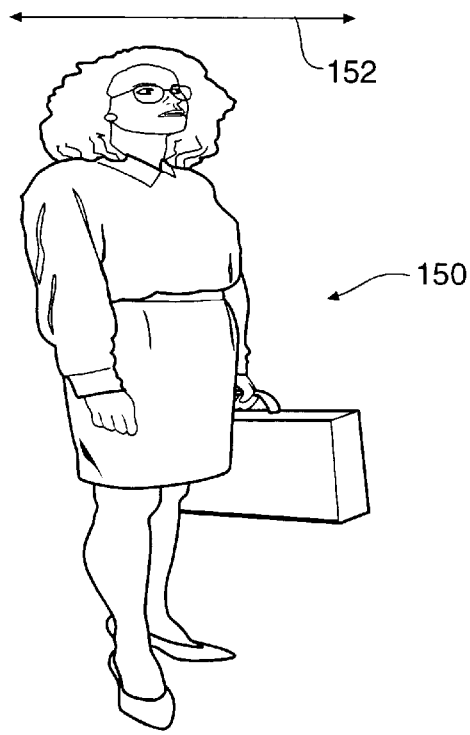
FIG. 9 illustrates the image of FIG. 8 as to how it can be automatically adjusted in shape.

Various changes and modifications may be made in accordance with the present invention. For example, the height of the image from the CGI may be made smaller or otherwise adjusted in shape to the PSI so as to provide the desired visual effect. Referring to FIG. 8, there is illustrated another selected CGI 150. Instead of simply adjusting the size, it may be desired to stretch, constrict, or otherwise distort the selected CGI in accordance with a predetermined relationship. Referring to FIG. 9, there is illustrated the CGI of FIG. 8 stretched in the horizontal direction, as indicated by arrow 152, to a predetermined size which could then be merged with a prestored image.

It is to be understood that various other changes and modifications may be made without departing form the scope of the present invention, the present invention being limited by the following claims.

Parts List

10 . . . central processing unit
11,13 . . . data link system
12,14,16,18,20,22 . . . input devices
32,34,36,38,40,42 . . . output devices
44 . . . server
100 . . . prestored image
102 . . . location
104 . . . basketball player
106 . . . basketball
108 . . . basketball hoop
110 . . . customer generated digital image element
112 . . . photograph
130,132,134,136,138,140,142 . . . step
152 . . . arrow

We claim:

1. The method of combining at least one captured generated digital image with a prestored digital image, comprising the steps of:
   a) selecting a prestored digital image, said prestored digital image having a predetermined location where a selected captured generated digital image may be placed, said location of said prestored image having a predetermined size or shape relationship;
   b) providing at least one capture means for obtaining a selected customer generated image element in digital form;
   c) providing at least one output means for printing, displaying, transmitting, or storing of an image;
   d) automatically modifying said selected customer generated digital image element in accordance with said predetermined size or shape relationship of said location of said prestored digital image so as to form a modified image element;
   e) combining the modified image element with said prestored digital image such that said modified image is located at said predetermined location so as to form a merged digital image; and
   f) forwarding said merged image to said output means.

2. A method according to claim 1 wherein said predetermined relationship is a size relationship.

3. A method according to claim 2 wherein said size relationship is in the range of 10–30% greater.

4. A method according to claim 2 wherein said size relationship is in the range of 10–30% less.

5. A method according to claim 1 wherein said selected customer generated image element comprises the height of an individual.

6. A method according to claim 1 wherein said customer generated image element is modified in shape.

7. A method according to claim 6 wherein said shape comprises stretching or constricting the selected customer generated image element.

8. The method of combining at least one captured generated digital image with a prestored digital image, comprising the steps of:
   a) selecting a prestored digital image, said prestored digital image having a predetermined location where a selected captured generated digital image element may be placed, said location of said prestored image having a predetermined size or shape relationship;
   b) obtaining a selected customer generated image element in digital form;
   c) automatically modifying said selected customer generated image element in accordance with said predetermined size or shape relationship of said location of said prestored digital image so as to form a modified image element; and
   d) combining the modified image element with said prestored digital image such that said modified image element is located at said predetermined location so as to form a merged digital image.

9. The method of combining at least one captured generated digital image with a prestored digital image, comprising the steps of:
   a) selecting a prestored digital image, said prestored digital image having a predetermined location where a captured generated digital image may be placed, said location of said prestored image having a predetermined size or shape relationship size;
   b) providing at least one capture means for obtaining a customer generated image in digital form;
   c) providing at least one output means for printing, displaying, transmitting, or storing of an image;
   d) obtaining an image element from said customer generated image;
   e) automatically modifying said selected image element in accordance with a predetermined relationship with said design feature of said prestored digital image so as to form a modified image;
   f) combining the modified image with said prestored digital image such that said modified image is located at said predetermined location so as to form a merged digital image; and
   g) forwarding said merged image to an output device.

* * * * *